(12) United States Patent
De Wit et al.

(10) Patent No.: US 7,590,385 B2
(45) Date of Patent: Sep. 15, 2009

(54) SYSTEM FOR SHARING HUMAN PERCEPTUAL SIGNALS BETWEEN ELECTRONIC DEVICES

(75) Inventors: Jiska Margriet De Wit, Eindhoven (NL); Kyriakos Mama, London (GB); Jeremy John Wright, Yorkcliff (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 454 days.

(21) Appl. No.: 10/531,930

(22) PCT Filed: Oct. 17, 2003

(86) PCT No.: PCT/IB03/04602

§ 371 (c)(1),
(2), (4) Date: Apr. 19, 2005

(87) PCT Pub. No.: WO2004/039104

PCT Pub. Date: May 6, 2004

(65) Prior Publication Data

US 2006/0067511 A1    Mar. 30, 2006

(30) Foreign Application Priority Data

Oct. 22, 2002    (EP)    .................................. 02257294

(51) Int. Cl.
*H04B 7/00*    (2006.01)
(52) U.S. Cl. ..................... 455/66.1; 455/41.2; 455/425; 455/426.1; 379/387.01

(58) Field of Classification Search ................ 455/66.1, 455/425, 426.1, 41.2; 379/387.01
See application file for complete search history.

(56) References Cited

U.S. PATENT DOCUMENTS

| | | | | |
|---|---|---|---|---|
| 4,974,251 | A * | 11/1990 | Ohta et al. | ................... 455/462 |
| 5,939,981 | A * | 8/1999 | Renney | ................. 340/539.32 |
| 6,819,924 | B1 * | 11/2004 | Ma et al. | ..................... 455/425 |
| 6,911,592 | B1 * | 6/2005 | Futamase et al. | .............. 84/622 |
| 2003/0104808 | A1 * | 6/2003 | Foschini et al. | ............. 455/423 |

FOREIGN PATENT DOCUMENTS

| | | | |
|---|---|---|---|
| WO | WO 99/25107 | * | 5/1999 |
| WO | WO9925107 A3 | | 5/1999 |
| WO | WO9952107 A2 | | 5/1999 |
| WO | WO0036857 A2 | | 6/2000 |
| WO | WO0036857 A3 | | 6/2000 |
| WO | WO0128221 A1 | | 4/2001 |

* cited by examiner

*Primary Examiner*—Nay A Maung
*Assistant Examiner*—Tuan H Nguyen

(57) ABSTRACT

A consumer electronics device makes content available and include a control unit and a transmitter. The control unit is able to create a representation of a human perceptual signal and instruct the transmitter to broadcast the representation. The device is able to access new content via a receiver. The control unit uses the receiver to receive representations of multiple further human perceptual signals and generate a human perceptual signal from these multiple representations.

21 Claims, 2 Drawing Sheets

SYSTEM FOR SHARING HUMAN PERCEPTUAL SIGNALS BETWEEN ELECTRONIC DEVICES

The invention relates to a system for sharing human perceptual signals.

The invention further relates to electronic devices for use in a system for sharing human perceptual signals.

The invention further relates to methods of enabling a system for sharing human perceptual signals.

The invention further relates to a computer program product for use in a system for sharing human perceptual signals.

It is known from peer-to-peer software such as Kazaa, Napster, Morpheus, and Gnutella to share selected digital content. A user of a first electronic device is able to retrieve a digital content item from a second electronic device and reproduce it on his or her first electronic device. It is known from portable audio devices, e.g. a Walkman, to reproduce analog and/or digital audio.

Most users want to access new content, but are unable to find new content without knowing a title or an artist of the content. Sometimes, content category information is available, but content categories of the known peer-to-peer software are not specific enough. Searching for a content category confronts a user with a large amount of new content items of which only few are of interest to the user. On the other hand, users often see other users listening to portable audio devices with a headphone and wonder what the other users are listening to, especially if the limited sound that escapes the head phone appeals to the users. There is a need for a system where the other users make their content available and the users are able to access new interesting content very easily.

It is a first object of the invention to provide a consumer electronic device for making content available, which enables finding interesting new content if a title or an artist of the content is not known.

It is a second object of the invention to provide an electronic device for accessing new content, which enables finding interesting new content if a title or an artist of the content is not known.

The first object is according to the invention realized in that the consumer electronic device for making content available comprises: an output means able to generate a human perceptual signal; a transmitter able to transmit a human non-perceptual signal; a control unit able to control the output means able to create a representation of the human perceptual signal, and able to instruct the transmitter to broadcast a human non-perceptual signal comprising the representation. A user of the consumer electronic device is able to share the audio and/or video content he or she is currently listening to and/or watching with other users. Since content will most likely be broadcasted only to other users in the vicinity of the user, the other users will not be confronted with a large amount of new content items. If other users notice the user listening to and/or watching interesting content, they may be able to instruct their consumer electronic device to listen to and/or watch the content themselves. Other users may be able to go to a location where a user may be found that shares their interest in a certain type of lifestyle and/or content. Creating a representation of the human perceptual signal may comprise compressing the content with a possible loss of quality. Creating a representation of the human perceptual signal may also comprise extracting a fragment from the content. Broadcasting a human non-perceptual signal may involve using Bluetooth, ZigBee, or ad-hoc wireless LAN (e.g. 802.11) technology.

In an embodiment of the consumer electronic device, the output means comprises at least one of a speaker and a headphone.

The output means may comprise a display.

The control unit may be able to instruct the transmitter to transmit a human non-perceptual signal comprising an identifier identifying the human perceptual signal. The identifier may comprise a title and/or an artist (e.g. singer or director) of the content. The identifier may be unique enabling a receiver of the content to retrieve extra information regarding the content.

The consumer electronic device may further comprise a receiver able to receive a further human non-perceptual signal, the control unit may be able to use the receiver to detect a free time-slot in a transmission medium, and the control unit may be able to instruct the transmitter to transmit the human non-perceptual signal in the free time-slot. By detecting a free time-slot, it is not necessary to have a central entity assigning time-slots.

The control unit may be able to use the receiver to receive a control signal and the control unit may be able to schedule own transmissions in accordance with the control signal. By having a controlled schedule of transmissions, collisions of transmitted packets and/or overhead needed to prevent collisions can be prevented.

The control unit may be able to use the receiver to detect a level of occupation of a transmission medium and the control unit may be able to instruct the transmitter to adapt its transmission power in dependency of the level of occupation. If a large number of transmitting devices are already active in a relatively small area, it might be impossible for other devices to start broadcasting in this area. Decreasing the transmission power of one device might then limit the interference between devices and allow another device to start broadcasting.

The control unit may be able to instruct the transmitter to transmit a human non-perceptual signal comprising transmission power of the transmitter. By setting the transmission power of a first device below the transmission power of a second device from which a weak signal is received, a third device closer to the second device might be able to start broadcasting without interference from the first device.

The second object is according to the invention realized in that the electronic device for accessing new content comprises: an output means for generating a human perceptual signal; a receiver able to receive a human non-perceptual signal; and a control unit able to use the receiver to receive multiple human non-perceptual signals comprising representations of multiple further human perceptual signals and able to instruct the output means to generate the human perceptual signal from the representations. By instructing the output means to generate the human perceptual signal from representations of multiple further human perceptual signals, a user of the device is able to listen to and/or watch multiple content items simultaneously.

In an embodiment of the apparatus of the invention, the electronic device further comprises an input means for enabling a user to select at least one of the representations and the control unit is able to instruct the output means to generate the human perceptual signal from the at least one of the representations. When the user hears or sees an interesting content item, he or she is able to focus on the content item by selecting one of the at least one representations.

The electronic device may further comprise a communication means for establishing communication between users and the control unit may be able to use the communication means to establish communication between a user of the electronic device and a user of a similar electronic device having transmitted a human non-perceptual signal comprising the at least one representation. When the user has focussed on the content item, he may be able to communicate with the user from whom the content item originates.

The control unit may be able to instruct the output means to make a further human perceptual signal more noticeable in the human perceptual signal if it is generated on a nearby further electronic device and less noticeable if it is generated on a remote further electronic device. When the user hears an interesting content item, he may be able to focus on the content item by walking towards the electronic device transmitting the content item. The volume of an acoustic signal may be higher if it is generated on a nearby further electronic device and lower if it is generated on a remote further electronic device. Visual signals may be shown simultaneously in different windows. The window size may be larger if a visual signal is generated on a nearby further electronic device and smaller if it is generated on a remote further electronic device.

The control unit may be able to use the receiver to receive multiple human non-perceptual signals comprising representations of acoustic signals.

The control unit may be able to use the receiver to receive multiple human non-perceptual signals comprising representations of visual signals. The control unit may also be able to use the receiver to receive multiple human non-perceptual signals comprising representations of both acoustic and visual signals, including those signals produced by computer games.

The control unit may be able to use the receiver to receive a human non-perceptual signal comprising an identifier identifying a further human perceptual signal and may be able to instruct a display to display the identifier. The identifier may comprise a title and/or an artist (e.g. singer or director) of the content.

The control unit may be able to use a storage means to store at least one of: an identifier identifying a further human perceptual signal and at least a part of the representation of the further human perceptual signal. When the user hears or sees an interesting content item, he or she may be able to store an identifier enabling him or her to find the content item at a later time. The user may also be able to store at least part of the representation of the further human perceptual signal in order to listen to the content item at a later time.

The receiver may be able to receive a human non-perceptual signal comprising a geographical position of a further electronic device transmitting a human non-perceptual signal comprising a representation of a further human perceptual signal. If the user wants to focus on a content item by walking towards the electronic device transmitting the content item, the geographical position of the transmitting electronic device makes finding the electronic device easier. The control unit may be able to use a current position of the receiving electronic device and the geographical position of the transmitting electronic device to calculate a direction towards the transmitting electronic device. The control unit may be able to display the direction on the display. The current position of the receiving device may for example be provided by a GPS receiver, possibly comprised in the receiving electronic device. Additionally, the control unit may be able to use the geographical position of a transmitting electronic device to show a location where interesting content has been found on a map using the display.

The control unit may be able to use the receiver to receive a human non-perceptual signal comprising an identifier identifying a further human perceptual signal. The electronic device may further comprise an input means for enabling a user to request additional information. The electronic device may further comprise a transmitter able to transmit a human non-perceptual signal. The control unit may be able to instruct the transmitter to transmit a human non-perceptual signal comprising a request for information and the identifier. The control unit may be able to use the receiver to receive a human non-perceptual signal comprising additional information. The extra information may comprise a list of other content items that the user of the electronic device transmitting the further human perceptual signal has listened to and/or watched and/or will listen to and/or watch. The extra information may also enable the user to buy a better representation of the human non-perceptual signal.

These and other aspects of the electronic devices, the methods, and the system of the invention will be further elucidated and described with reference to the drawing, in which.

Corresponding elements within the drawings are identified by the same reference numeral.

Figure 1:
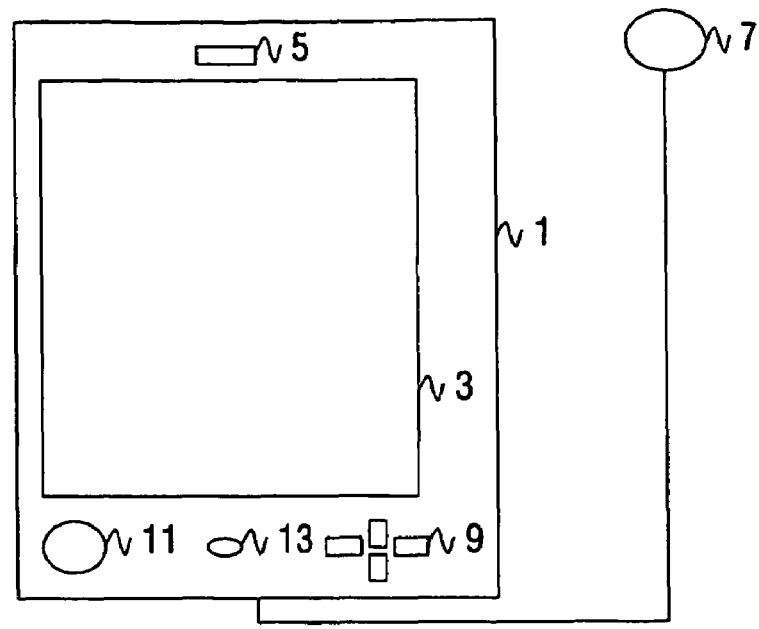
FIG. 1 is a front view of a favorable embodiment of the electronic devices of the invention.
Figure 2:
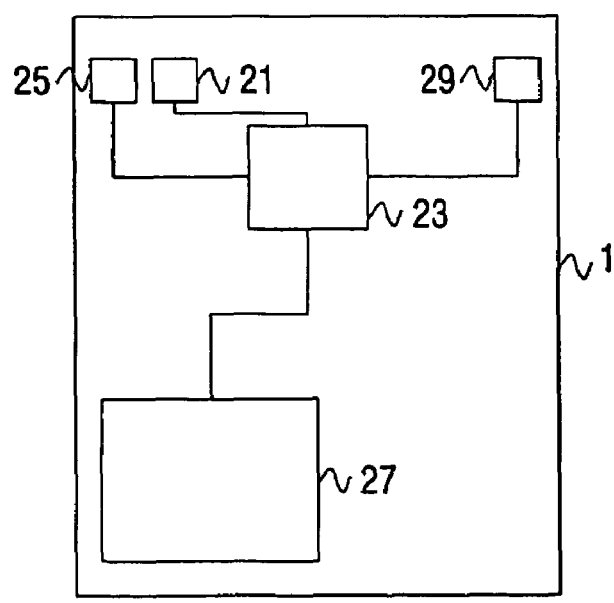
FIG. 2 is a block diagram of the embodiment of FIG. 1.

Consumer electronic device 1, see FIG. 1 and FIG. 2, is a favorable embodiment of both the consumer electronic device for making content available and the electronic device for accessing new content. The consumer electronic device 1 unifies the components and functionality of both electronic devices. Alternatively, the consumer electronic device for making content available could be a different device than the electronic device for accessing new content. The consumer electronic device 1 comprises a display 3, a speaker 5, and a headphone 7 able to generate a human perceptual signal. The consumer electronic device 1 also comprises a transmitter 21 able to transmit a human non-perceptual signal and a control unit 23 able to control the display 3, the speaker 5, and the headphone 7. The control unit 23 is further able to create a representation of the human perceptual signal and to instruct the transmitter 21 to broadcast a human non-perceptual signal comprising the representation. The consumer electronic device 1 may for example be a car radio, a portable audio and/or video player, a mobile phone, or a handheld game console. The control unit 23 may be a microprocessor. The display 3 may for example be a LCD or LED display. A human non-perceptual signal may for example be an electromagnetic signal. A human perceptual signal may for example be an acoustic or a visual signal.

The control unit 23 may be able to instruct the transmitter 21 to transmit a human non-perceptual signal comprising an identifier identifying the human perceptual signal.

The consumer electronic device 1 further comprises a receiver 25 able to receive a further human non-perceptual signal. The control unit 23 may be able to use the receiver 25 to detect a free time-slot in a transmission medium, and the control unit 23 may be able to instruct the transmitter 21 to transmit the human non-perceptual signal 53 in the free time-slot. The transmitter 21 and the receiver 25 will most likely respectively transmit and receive wireless signals and may for example use Bluetooth, IEEE 802.11, or ZigBee technology. The transmission medium may for example be a part of the 2.4 GHz band in the microwave spectrum. Alternatively, the transmission medium could be a copper or fiber-optic cable.

The control unit 23 may be able to use the receiver 25 to receive a control signal, and the control unit 23 may be able to schedule own transmissions in accordance with the control signal.

The control unit 23 may be able to use the receiver 25 to detect a level of occupation of a transmission medium, and the control unit 23 may be able to instruct the transmitter 21 to adapt its transmission power in dependency of the level of occupation.

The control unit 23 may be able to instruct the transmitter 21 to transmit a human non-perceptual signal comprising transmission power of the transmitter 21.

The control unit may be able to use the receiver 25 to receive multiple human non-perceptual signals comprising representations of multiple further human perceptual signals and able to instruct the display 3, the speaker 5, and/or the headphone 7 to generate the human perceptual signal from the representations The consumer electronic device 1 further comprises a cursor pad 9 for enabling a user to select at least one of the representations and the control unit is able to instruct the output means to generate the human perceptual signal from the at least one of the representations. Alternatively and/or additionally, other types of input means may be comprised in the electronic device 1, for example a touch-screen or a touch-pad. Another input means could be used to select the at least one of the representations.

The consumer electronic device 1 further comprises a communication means 29 for establishing communication between users and the control unit 23 is able to use the communication means 29 to establish communication between a user of the consumer electronic device 1 and a user of a similar consumer electronic device 1 having transmitted a human non-perceptual signal comprising the at least one representation. The communication means 29 may for example comprise components used in a cell phone. Communication means 29 may be part of at least one of the other components in the consumer electronic device 1. Communications means 29 could for example be realized by using transmitter 21, receiver 25, control unit 23 and/or a microphone 13.

The control unit 23 is able to instruct the display 3, the speaker 5, and/or the headphone 7 to make a further human perceptual signal more noticeable in the human perceptual signal if it is generated on a nearby further electronic device and less noticeable if it is generated on a remote further electronic device.

The control unit 23 is able to use the receiver 25 to receive multiple human non-perceptual signals comprising representations of acoustic signals.

The control unit 23 is able to use the receiver 25 to receive multiple human non-perceptual signals comprising representations of visual signals.

The control unit 23 is able to use the receiver 25 to receive a human non-perceptual signal comprising an identifier identifying a further human perceptual signal and to instruct the display 3 to display the identifier.

The control unit 23 is able to use a storage means 27 to store at least one of: an identifier identifying a further human perceptual signal and at least a part of the representation of the further human perceptual signal. The storage means 27 may be comprised in the electronic device 1 as shown in FIG. 1 or may be comprised in an external device. The storage means 27 may for example be an optical disc, flash memory, magnetic memory, or a magnetic disc.

The receiver 25 is able to receive a human non-perceptual signal comprising a geographical position of a further electronic device transmitting a human non-perceptual signal comprising a representation of a further human perceptual signal. The geographical position may comprise longitude and latitude.

The control unit 23 is able to use the receiver 25 to receive a human non-perceptual signal comprising an identifier identifying a further human perceptual signal. The consumer electronic device 1 further comprises a button 11 for enabling a user to request additional information and a transmitter 21 able to transmit a human non-perceptual signal. The control unit 23 is able to instruct the transmitter 21 to transmit a human non-perceptual signal comprising a request for information and the identifier and to use the receiver to receive a human non-perceptual signal comprising additional information. Alternatively, another input means could be used for enabling a user to request additional information instead of button 11. Another input means could for example be the cursor pad 9, a touch-screen, or a touch-pad.

Figure 3:
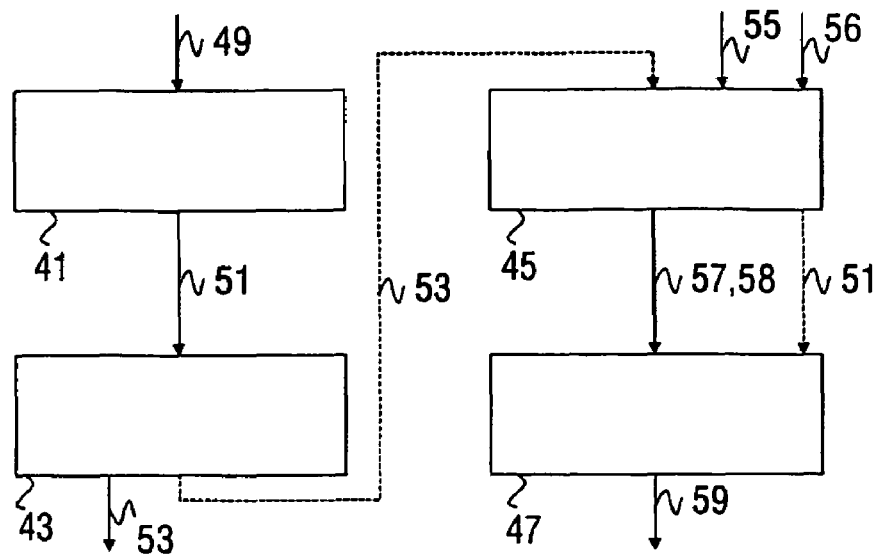
FIG. 3 is a flow diagram of an embodiment of the methods of the invention.

The method of making content available, see FIG. 3, comprises step 41 creating a representation 51 of a human perceptual signal 49 generated by a consumer electronic device and step 43 broadcasting the representation 51. The representation 51 may be broadcasted as human non-perceptual signal 53.

The method of accessing new content comprises step 45 receiving representations 57, 58, and optionally 51 of multiple further human perceptual signals and step 47 generating a human perceptual 59 signal from the received representations. The representations 51, 57, and 58 may be received comprised in respectively human non-perceptual signals 53, 55, and 56.

Figure 4:
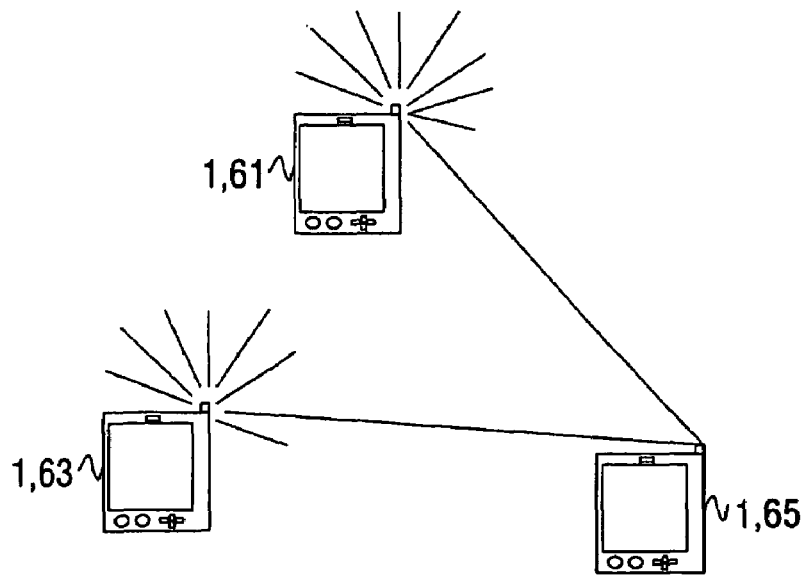
FIG. 4 is a block diagram of an embodiment of the system of the invention.

The system for sharing human perceptual signals, see FIG. 4, comprises a component 61 able to create and broadcast a first representation of a first human perceptual signal. The system also comprises a component 63 able to create and broadcast a second representation of a second human perceptual signal. The system further comprises a component 65 able to receive the first and the second representation and able to generate a third human perceptual signal from the first and the second representation. Each of the components may be a consumer electronic device 1 of FIG. 1 and FIG. 2.

While the invention has been described in connection with favorable embodiments, it will be understood that modifications thereof within the principles outlined above will be evident to those skilled in the art, and thus the invention is not limited to the favorable embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. In the apparatus claim enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

The invention claimed is:

1. A consumer electronic device configured for making its content available comprising:
   an output means configured to generate a human perceptual signal of content, wherein the content is to be made available to share with a further electronic device in a vicinity of the consumer electronic device;
   a transmitter configured to transmit a human non-perceptual signal; and
   a control unit configured (i) to control the output means, (ii) to create a representation of the human perceptual signal of the content being generated by the output means, and (iii) to instruct the transmitter to broadcast a human non-perceptual signal comprising the representation;
   wherein the control unit is further configured to instruct the output means to make a received human perceptual signal, generated from a further human non-perceptual signal that is received from a further electronic device for accessing new content, more noticeable in response to being received from a nearby further electronic device and less noticeable in response to being received from a remote further electronic device.

2. The consumer electronic device as claimed in claim 1, wherein the output means comprises at least one of a speaker and a headphone.

3. The consumer electronic device as claimed in claim 1, wherein the output means comprises a display.

4. The consumer electronic device as claimed in claim 1, wherein the control unit is further configured to instruct the transmitter to transmit a human non-perceptual signal comprising an identifier identifying the human perceptual signal.

5. The consumer electronic device as claimed in claim 1, further comprising a receiver configured to receive the further human non-perceptual signal, wherein the control unit is further configured to use the receiver to detect a free time-slot in a transmission medium, and the control unit is further configured to instruct the transmitter to transmit the human non-perceptual signal in the free timeslot.

6. The consumer electronic device as claimed in claim 1, further comprising a receiver configured to receive a further human non-perceptual signal, wherein the control unit is further configured to use the receiver to receive a control signal, and the control unit is further configured to schedule transmissions in accordance with the control signal.

7. The consumer electronic device as claimed in claim 1, further comprising is a receiver configured to receive a further human non-perceptual signal, wherein the control unit is further configured to use the receiver to detect a level of occupation of a transmission medium, and the control unit is further configured to instruct the transmitter to adapt its transmission power in dependency of the level of occupation.

8. The consumer electronic device as claimed in claim 1, wherein the control unit is further configured to instruct the transmitter to transmit a human non-perceptual signal comprising a transmission power of the transmitter.

9. An electronic device for accessing new content comprising:
   an output means for generating a human perceptual signal;
   a receiver configured to receive a human non-perceptual signal; and
   a control unit configured (i) to use the receiver to receive multiple human non-perceptual signals comprising representations of multiple further human perceptual signals of content available for sharing by further electronic devices in a vicinity of the electronic device and (ii) to instruct the output means to generate the human perceptual signal from the representations;
   wherein the control unit is further configured to instruct the output means to make a received human perceptual signal, generated from a further human non-perceptual signal that is received from a further electronic device for accessing the new content, more noticeable in response to being received from a nearby further electronic device of the further electronic devices and less noticeable in response to being received from a remote further electronic device of the further electronic devices.

10. The electronic device as claimed in claim 9, further comprising an input means for enabling a user to select at least one of the representations, wherein the control unit is further configured to instruct the output means to generate the human perceptual signal from the at least one of the representations in response to a user selection.

11. The electronic device as claimed in claim 10, further comprising a communication means for establishing communication between users, wherein the control unit is further configured to use the communication means to establish communication between a user of the electronic device and a user of a similar electronic device having transmitted a human non-perceptual signal comprising the at least one representation.

12. The electronic device as claimed in claim 9, wherein the control unit is further configured to use the receiver to receive multiple human non-perceptual signals comprising representations of acoustic signals.

13. The electronic device as claimed in claim 9, wherein the control unit is further configured to use the receiver to receive multiple human non-perceptual signals comprising representations of visual signals.

14. The electronic device as claimed in claim 9, wherein the control unit is further configured to use the receiver to receive a human non-perceptual signal comprising an identifier identifying a further human perceptual signal and to instruct a display to display the identifier.

15. The electronic device as claimed in claim 9, wherein the control unit is further configured to use a storage means to store at least one of: (i) an identifier identifying a further human perceptual signal and (ii) at least a part of the representation of the further human perceptual signal.

16. The electronic device as claimed in claim 9, wherein the receiver is further configured to receive a human non-perceptual signal comprising a geographical position of a further electronic device transmitting a human non-perceptual signal comprising a representation of a further human perceptual signal.

17. The electronic device as claimed in claim 9, wherein
   the control unit is further configured to use the receiver to receive a human non-perceptual signal comprising an identifier identifying a further human perceptual signal, the electronic device further comprising:
   an input means for enabling a user to request additional information; and
   a transmitter configured to transmit a human non-perceptual signal, wherein
   the control unit is further configured to instruct the transmitter to transmit a human non-perceptual signal comprising a request for information and the identifier; and
   the control unit is further configured to use the receiver to receive a human non-perceptual signal comprising additional information in responsive to the request.

18. A method of making content available, comprising:
   creating a representation of a human perceptual signal of content generated by a first electronic device, wherein the content is to be made available to share with a second electronic device in a vicinity of the first electronic device; and broadcasting the representation as a human non-perceptual signal for playback of the human perceptual signal by the second electronic device, wherein the second electronic device generates the human perceptual signal, in response to the received representation, to access the content as more noticeable if the second electronic device is near the first electronic device and less noticeable if second electronic device is remote from the first electronic device.

19. A method of accessing new content by a first electronic device, comprising:

receiving representations of human perceptual signals of new content being generated as human perceptual signals, wherein the representations comprise human non-perceptual signals of the human perceptual signals of new content broadcast by further electronic devices in a vicinity of the first electronic device; and generating a human perceptual signal of the new content at the first electronic device from the representations, wherein the generated human perceptual signal is more noticeable in response to being received from a nearby electronic device of the further electronic devices and less noticeable in response to being received from a remote electronic device of the further electronic devices.

20. A system for sharing human perceptual signals of content between electronic devices within a vicinity of one another, the system comprising:

a first component configured to create and broadcast a first representation of a first human perceptual signal representative of content being generated by the first component and for sharing with a further component in the vicinity of the first component;

a second component configured to create and broadcast a second representation of a second human perceptual signal representative of content being generated by the second component and for sharing with a further component in the vicinity of the second component; and a third component configured to receive the first and the second representation and further configured to generate a third human perceptual signal representative of shared content in response to the first and the second representation;

wherein the third human perceptual signal is more noticeable in response to being received from a nearby electronic device of the first and second components and less noticeable in response to being received from a remote electronic device of the first and second components.

21. A computer readable medium embodying a computer program comprising instructions for:

receiving representations of human perceptual signals of new content at a first electronic device, wherein the representations comprise human non-perceptual signals of the human perceptual signals of new content broadcast by further electronic devices in a vicinity of the first electronic device; and generating a human perceptual signal of the new content at the first electronic device from the representations;

wherein the generated human perceptual signal of the new content at the first electronic device is more noticeable in response to being received from a nearby electronic device of the further electronic devices and less noticeable in response to being received from a remote electronic device of the further electronic devices.

* * * * *